Dec. 1, 1964    A. W. RAFFERTY    3,159,310
AUTOMATICALLY CONTROLLED FLUID DISPENSER
Filed March 5, 1964    6 Sheets—Sheet 1

INVENTOR
ARTHUR W. RAFFERTY
BY Frank E. Johnston
Ralph L. Freeland Jr
ATTORNEYS

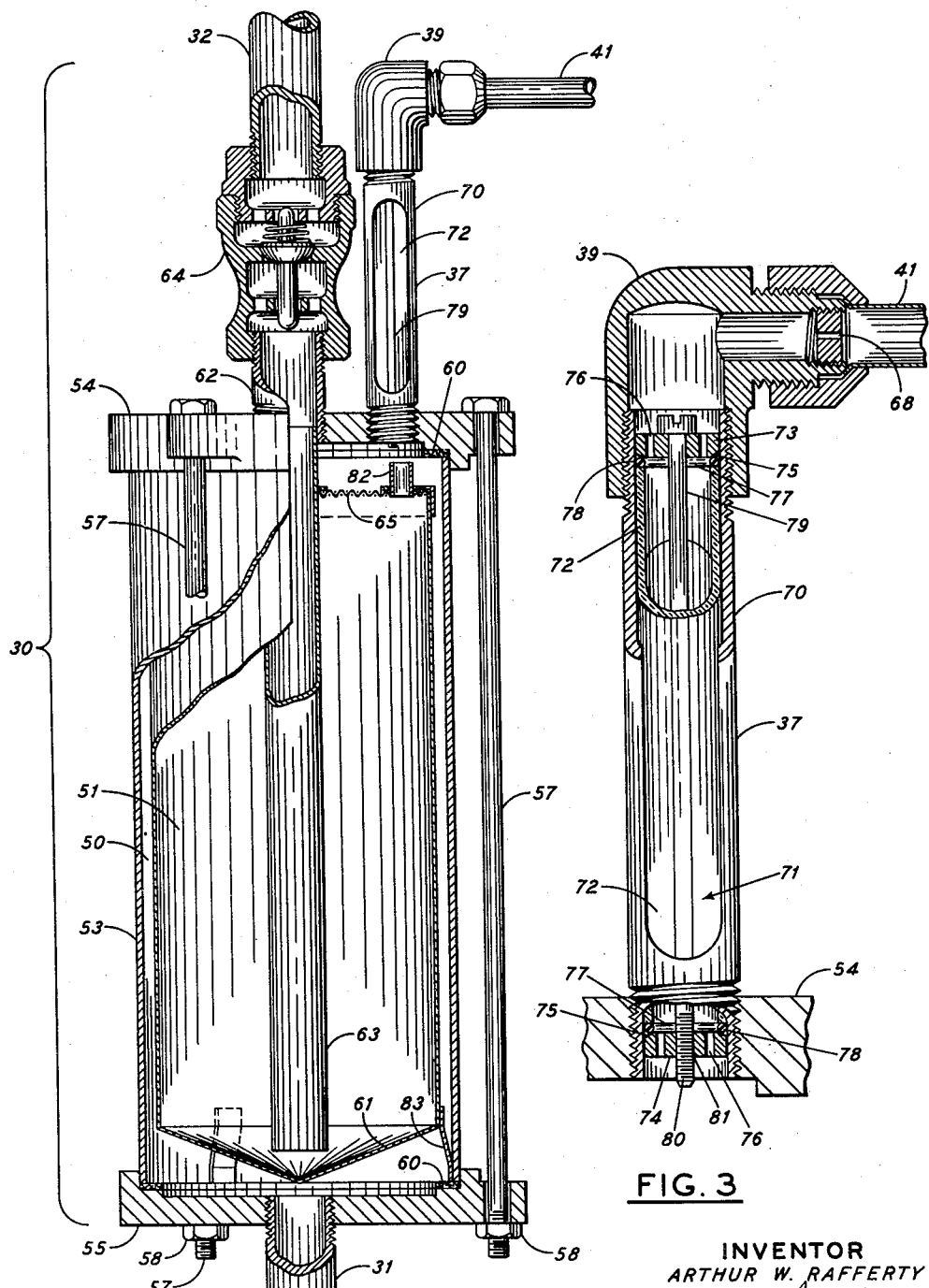

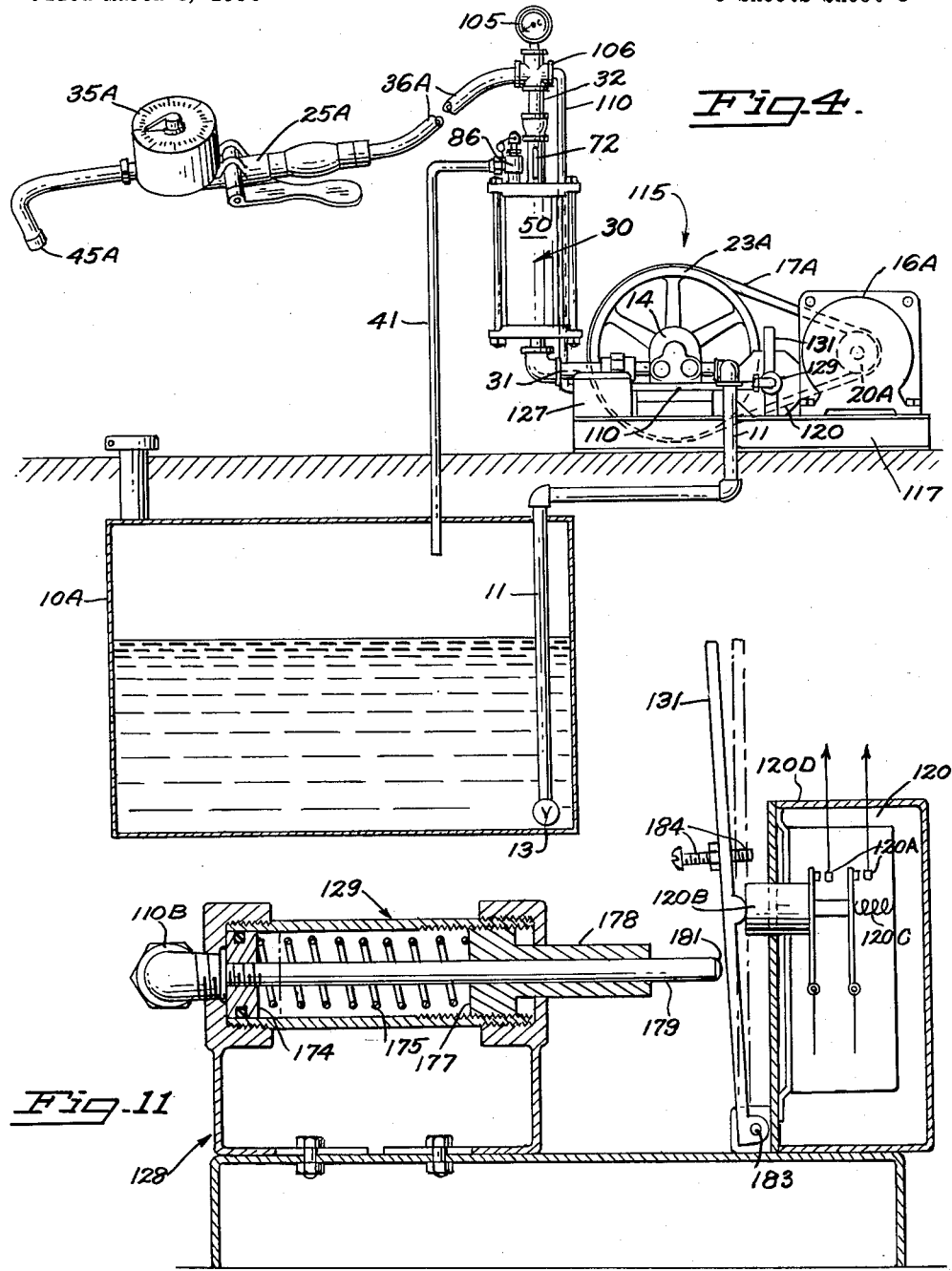

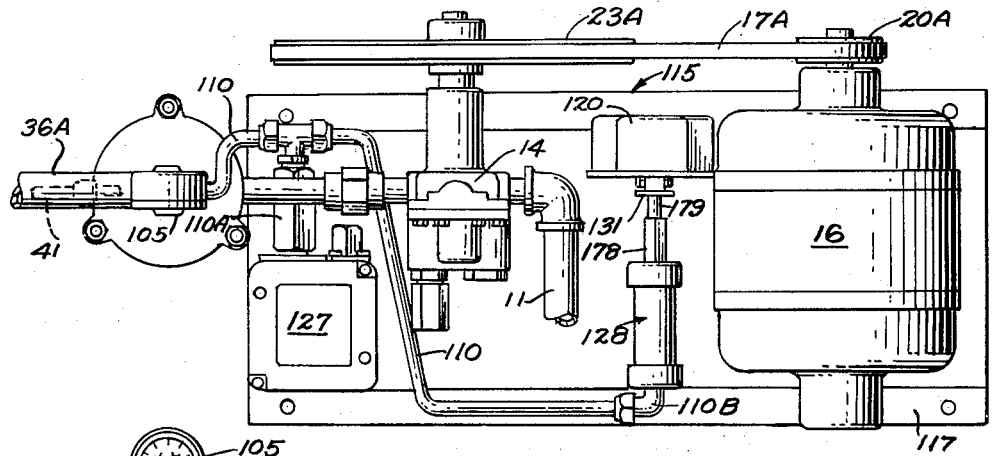
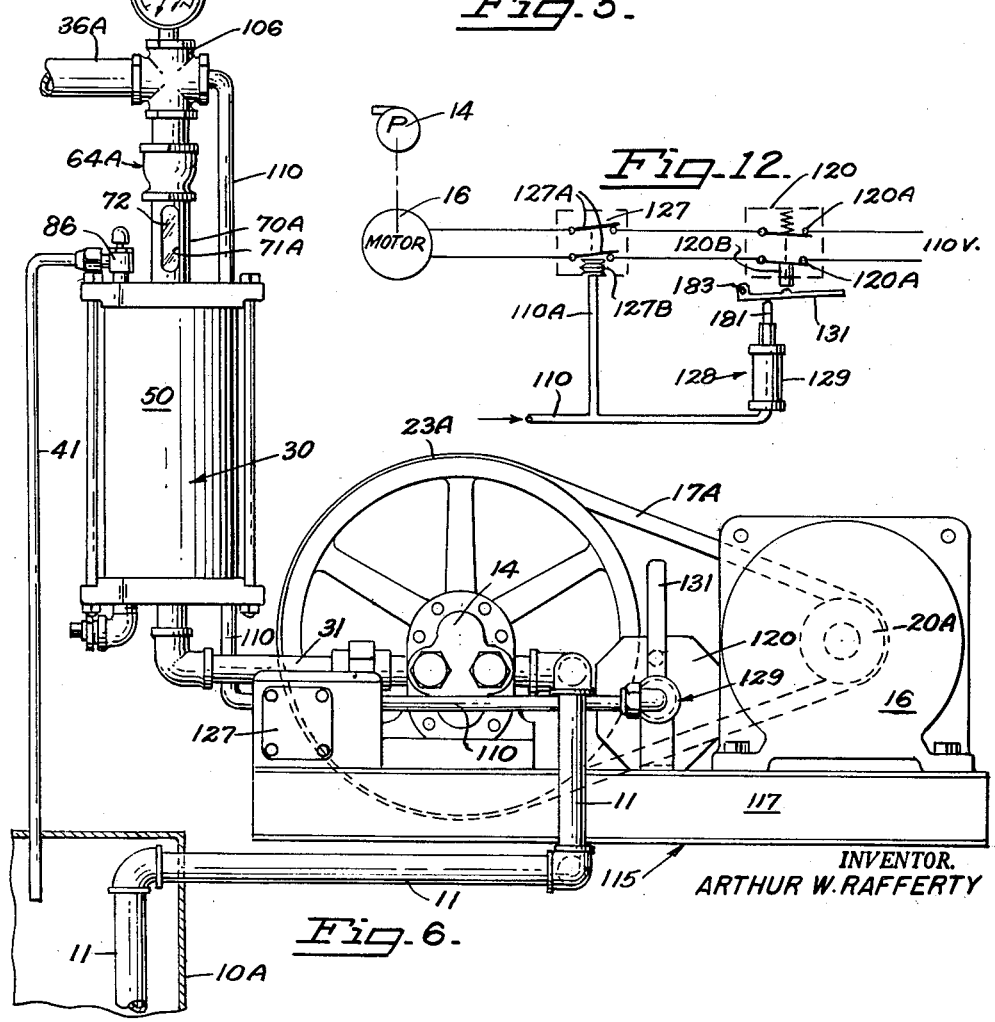

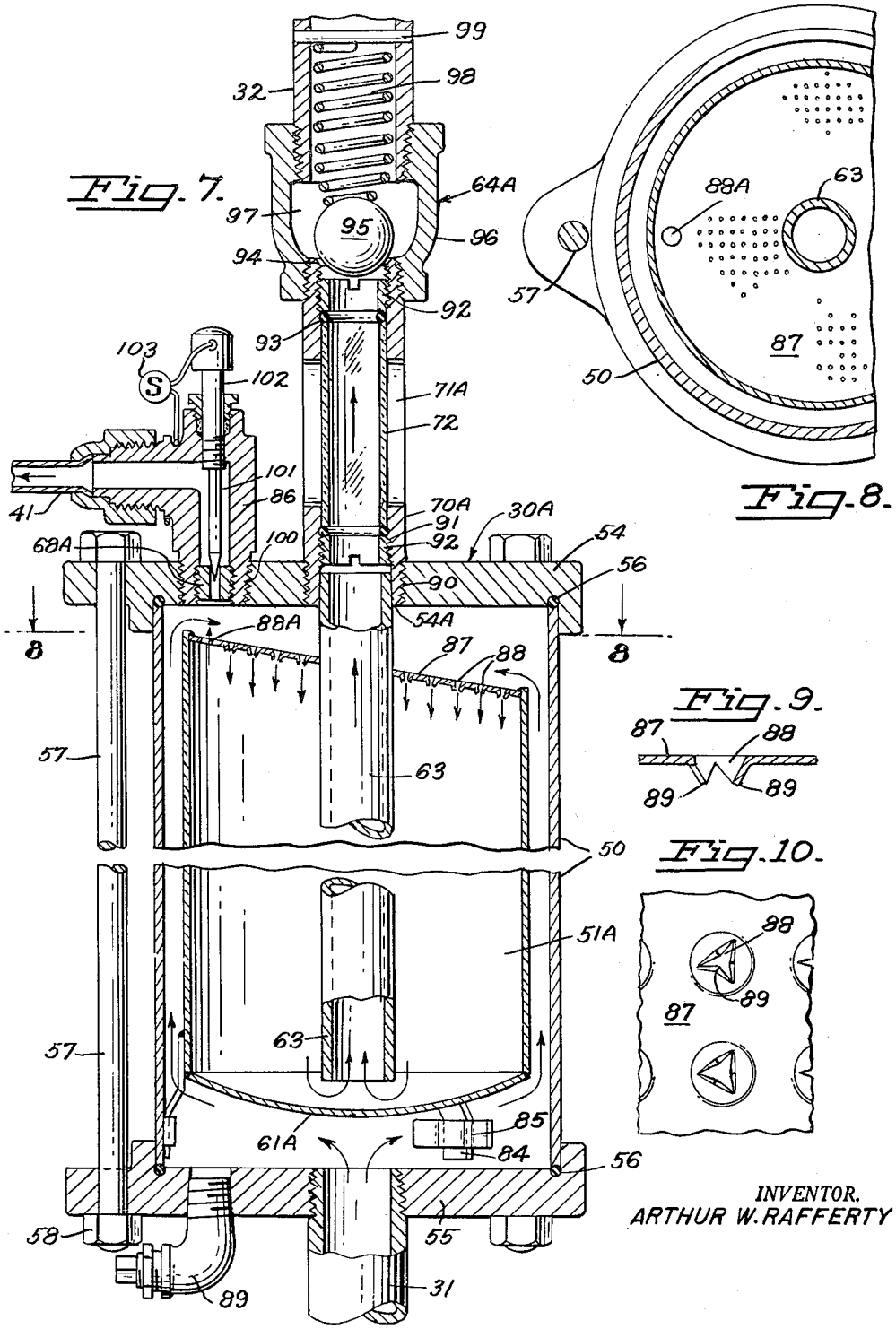

INVENTOR.
ARTHUR W. RAFFERTY

United States Patent Office 3,159,310
Patented Dec. 1, 1964

3,159,310
AUTOMATICALLY CONTROLLED FLUID
DISPENSER
Arthur W. Rafferty, 933 3rd Ave., Sacramento 18, Calif.
Filed Mar. 5, 1964, Ser. No. 350,144
12 Claims. (Cl. 222—63)

This invention relates to automatic liquid dispensing systems. More particularly, it relates to apparatus for preventing entrapment of air in, and, where necessary, for elimination of air from, a liquid, such as lubricating oil, so that true measure can be metered and pressure dispensed from a remote reservoir.

It is a primary object of the invention both to prevent air entrapment and to provide air elimination, so that lubricating oil and the like can be meter-dispensed in a manner similar to present-day gasoline dispensing. In a preferred embodiment of the invention, an air eliminator of unique design is placed in the dispensing system between a pump for lifting oil from a supply reservoir and the valve-controlled outlet, such as a dispensing valve. The air eliminator includes an isolating reservoir into which oil is pumped through a surrounding chamber. A return flow line to the supply reservoir from the top of said chamber and above said cup controls a part of the liquid so that upon loss of prime at the pump by line breakage or oil depletion the entire gas capacity of the pump is bypassed back to the supply and no air-contaminated oil enters the discharge system beyond said isolating reservoir cup. Upon repriming of the pump, air entrapped in the oil is additionally bypassed back to the reservoir until a continuous flow of oil between supply reservoir and said cup reservoir is established. This is in part controlled by a one-way check valve in the outlet line connected to the bottom of said cup, which is adjusted to prevent oil delivery until a preselected pressure is exceeded in the discharge line.

Further in accordance with my invention, the aeration of oil by the pump is reduced to a minimum by using the discharge pressures beyond said check valve to control automatically the entire oil-dispensing operation. It includes a first control means for starting and stopping said pump in response to normal pressure variations required to dispense oil through a dispensing valve and liquid-delivery recording meter at a practical flow rate. It further includes a second control means operable at a pressure of a predeterminably low value relative to the low starting pressure for said first control means, so that said pump can be stopped in response to a loss of prime. Thus, even with the reservoir supply located remotely (underground or in the service station), the metered delivery of oil at a valved discharge nozzle on the end of a hose reel at a service island can be full and honest (no air included). This will be so, even without knowledge by the attendant that the oil supply has been interrupted during delivery, because said second control means will prevent delivery upon loss of prime. Further, the oil remaining in the line and in the pump will not be unduly aerated by virtue of such control means, and said air eliminator will not be required continuously to remove air from the oil supplied thereto.

This application is in part a continuation of my copending application for Fluid Dispenser, Serial No. 60,-188, filed October 3, 1960.

Though my invention is adaptable for purposes of air elimination in any liquid, the invention is described by way of example with particular reference to the dispensing of petroleum products such as lubricating and gear oils in the so-called "service stations" for automobiles that sell such petroleum products to the public in retail quantities, although similar problems in dispensing of fluids may also be present in other fields of operation.

Very satisfactory dispensing and air eliminating apparatus has been provided for fluids that have a high degree of liquidity but substantially no practical viscosity, such as gasoline. Such liquids can thus normally be dispensed by pump at a pump block or island in such service stations without danger of air being metered as product. Other products, however, of greater viscosity, such as cleaning and flushing liquids for valves and engines, and also light and heavy engine oils. and relatively heavy gear oils, have to a very great extent been dispensed at retail by means of containers such as cans and bottles. This is a slow process, requiring manpower and time to fill containers. It also offers opportunity for substitution of dispensed product, as well as the problem of complete drainage of such containers, since if there is a failure of proper and complete drainage, then there is a residue of fluid in the container for which the customer pays but does not receive. Various inspection officers and officials in weights and measure departments of the various states are very particular that full measure be delivered to the purchaser, and this is particularly applicable to lubricating and gear oils, which are among the most expensive liquid products sold at retail to the public by service stations.

There are mechanical dispensing systems by which such air-entrained liquids may be dispensed, but a principal objection thereto has been that air of agitation is included in the liquid which is dispensed, and this air is metered as oil on the dispensing meter unless an efficient air eliminator is employed in the system. Even with the inclusion of the usual air eliminator these dispensing systems lack any effective control to prevent registration on the dispensing meter of air in the event that the contents of the oil supply tank becomes depleted during delivery, or the supply line breaks, and the dispensing pump continues to run. Also, due to present use of additives in lubricating oils, the usual pumping system will emulsify and aerate any petroleum product after the pump has lost its prime following such a depletion of the oil supply. When the pump is reprimed following refilling of the supply tank, or repair of the lines, this entrained air passes through the meter and is registered as oil.

Because it is difficult completely to eliminate entrained air which has once entered the pumping system, I have found it highly desirable not only to provide a more efficient air elimination system, but also to stop the pumps automatically when the liquid pressure in the system falls below a predetermined pressure value, which condition may arise if there is a rupture in the tubing or pipe system or when the pump has lost its prime, such as when the reservoir supply of oil is depleted.

In a preferred embodiment of my air eliminator, oil from a positive displacement pump flows through a pair of concentric chambers in which the inlet to the separator enters at the bottom closure plate of the outer cylinder, so that oil flows upwardly along the outside of the inner cylinder, which is closed adjacent the inlet end, and enters the inner cylinder or reservoir cup adjacent the upper or outlet end of the outer cylinder. Oil then enters the cup through a deaerator screen that covers its open end, which is adjacent the outlet end of the air eliminator. The outlet of oil after deaeration is through an outlet opening formed in the opposite end of the outer cylinder and connected through a submerged delivery tube that terminates near the bottom of the inner cylinder.

Further in accordance with the preferred form of the air eliminator, a small amount of deaerated fluid is returned to the sump, or oil supply source, through an orifice connected into a flow line that parallels the outlet from the oil-air eliminator but which terminates directly adjacent the upper end of the outer cylinder. Said orifice is variable, either by use of interchangeable inserts or a needle valve. It is adjusted to pass the full air- or gas-pumping capacity of the positive displacement pump, but capable of passing only a small amount, say 5%, of the oil pumping capacity. Such oil return may be made through a sight-glass tube so that the oil can be checked visually as to its freedom from entrained air. Alternatively, the sight glass is placed in the discharge line from the air eliminator. In either location, the sight glass permits indication that deaerated oil is passing to the meter and dispensing nozzle under pressure.

Further in accordance with the invention, the outlet delivery line of the air eliminator includes a spring-loaded one-way check valve that will not permit oil to flow until a predetermined, positive pressure is applied to the fluid by the positive displacement pump, thereby assuring against syphoning of oil from the reservoir cup in the oil-air eliminator when the dispensing valve mechanism is cut off at the metering end of the output line, or when the oil pump is not in actual operation.

Further objects and advantages of the present invention will become apparent from the following detailed description taken in conjunction with the accompanying drawings which form an integral part of the present application.

FIG. 2 is a vertical cross-sectional view of the air eliminator illustrated in FIG. 1, which forms an integral part of the present invention.

FIG. 3 is an enlarged view illustrating the constructional details of the sight glass through which oil flows back to the oil supply line through a restricting orifice.

FIG. 4 is a longitudinal side elevation of an ensemble of a mechanical layout incorporating the invention in a fully automatic oil dispensing system.

FIG. 5 is a plan view illustrating a mechanical layout of the form of the invention shown in FIG. 4.

FIG. 6 is a longitudinal side elevation of FIG. 5, showing in addition a reservoir tank and indicating feed piping thereto in dotted line.

FIG. 7 is an enlarged fragmentary vertical section of an alternate arrangement of the air eliminator cylinder container and appurtenant valve structure, and similar to that shown in FIG. 2.

FIG. 8 is a fragmentary enlarged transverse plan view of line 8—8 of FIG. 7.

FIG. 9 is a fragmentary enlarged side view of detail of FIG. 8.

FIG. 10 is a fragmentary enlarged bottom view of detail of FIG. 8.

FIG. 11 is an enlarged vertical sectional view of pressure-operated automatic pump-control mechanism.

FIG. 12 is a wiring diagram of an electric switch circuit.

Figure 1:
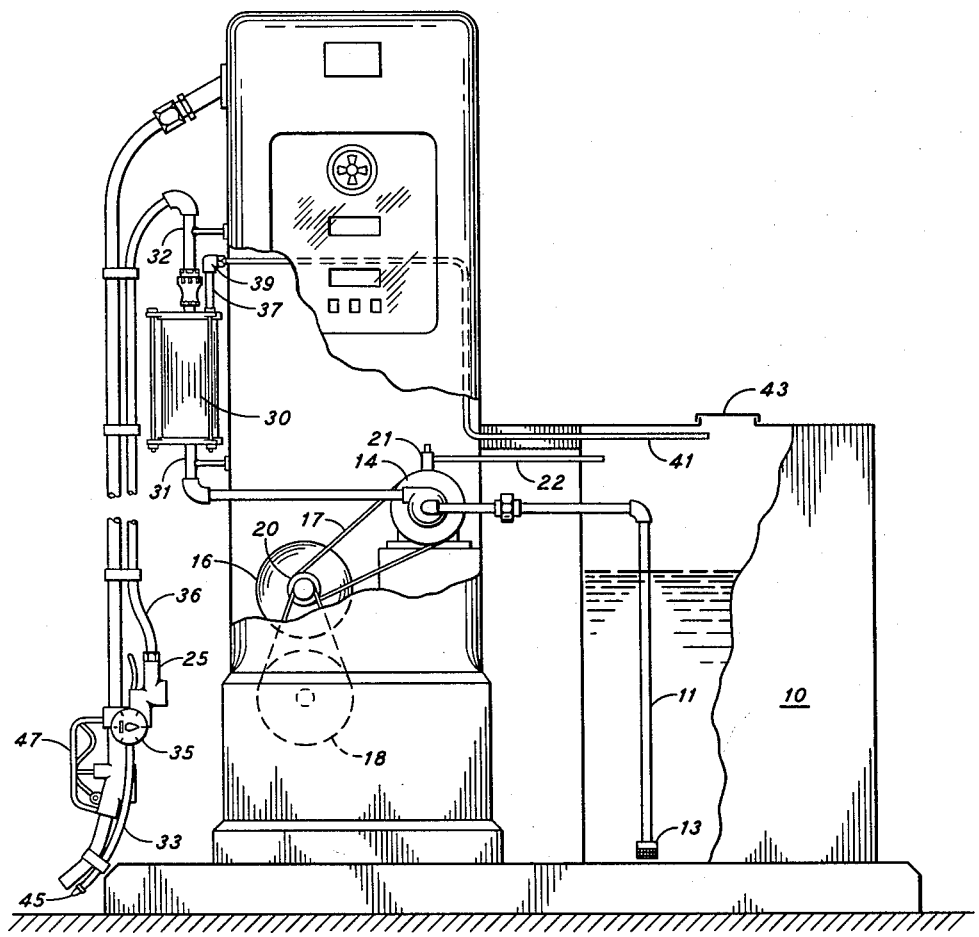
FIG. 1 is a schematic representation of the present invention as applied to a dual-delivery dispenser such as that used for dispensing motor oil and gasoline to marine outboard motors or to four-cycle engines, with only one piece of equipment.

Referring now to the drawings and in particular to FIG. 1, there is illustrated one application of the air eliminator feature of my invention to a dual delivery system for gasoline and oil of the type that is useful for servicing outboard motors or four-cycle engines where fuel, including diesel oil and lubricating oil, must be delivered from separate receptacles. While the gasoline-dispensing portion of the arrangement is shown for illustrative purposes, it is to be understood that it does not form any part of the present invention.

As shown in the drawing, oil that is to be metered to a consumer is supplied in a barrel, tank, or drum 10. Oil is withdrawn from drum 10 by an inlet line 11 which includes a strainer and foot-valve arrangement 13 near the bottom of tank 10. From the supply line, oil is pumped by positive-displacement pump 14 which may be suitably driven by gasoline-pump motor 16 through a pulley-and-belt arrangement indicated as 17. Since it will often be desirable to pump oil at the same time gasoline is being pumped, the two pumps, pump 14 for oil and pump 18 for the gasoline dispenser, may be belted directly on a common dual-drive pulley 20. However, to prevent unnecessary loading on positive-displacement pump 14, a pressure-relief valve 21 permits oil to return to tank 10 to line 22 whenever oil-dispensing valve 25 is closed with motor 16 running. Additionally, this pressure-relief avoids the heating and aeration of oil which would occur during a large, straight gasoline delivery by gasoline pump 18.

A particularly important part of the present invention is provision for insuring that only oil is delivered without entraining air bubbles, as for example when the oil supply in tank 10 is exhausted, and air is drawn in through foot valve 13 in inlet line 11. For this purpose, an air eliminator 30 is positioned intermediate the positive-displacement pump 14 and valve 25 in supplying oil to dispensing tube 33 through meter 35.

Before proceeding with the detailed description of air eliminator 30 and its function in providing correct visual assurance to the purchaser that he is buying only oil and not entrained air as a part of the metered volume, it will be noted in FIG. 1 that a small, essentially constant volume of oil is returned to tank 10 through sight glass 37 and through an orifice in fitting 39 before returning through line 41 to tank 10. It will be noted that return line 41 is preferably positioned directly below the filler cap 43 of tank 10, so that an actual flow of oil through line 41 may be demonstrated to the purchaser, or the sealer of weights and measures. In accordance with the present embodiment of this invention, the orifice 68 in fitting 39 is so proportioned that it will pass the entire gas or air pumping capacity of positive-displacement pump 14, but will pass only a small portion of the oil pumped by this unit.

Further, in the arrangement for dispensing oil through a metering system, it will be noted that dispenser hose 33 includes an antidrip device, indicated as 45, which assures that oil always fills line 33 between meter 35 and the antidrip device 45. In this way, when the meter 35 operates, the registered amount of fluid is the amount of fluid actually dispensed through the end of hose 33.

It will also be noted in FIG. 1 that the oil-dispensing hose and gas hose run parallel to each other so that the operator may conveniently operate both the separate gasoline-dispensing valve 47 and the oil-dispensing valve 25 simultaneously, as in dispensing products to a two-cycle engine fuel tank.

Reference is now made to FIG. 2, wherein the air eliminator for oil being pumped from tank 10 through dispenser hose 33 will be suitably deaerated in order to assure that the purchaser is obtaining oil alone and not oil including entrained air. As shown in FIG. 2 air eliminator 30 comprises a pair of concentric chambers identified as 50 and 51, respectively. Outer chamber or cylinder 50 may be suitably formed by a section of metal tubing several inches in diameter, as indicated at 53. Chamber 50 is closed by upper and lower end plates 54 and 55, respectively. End plates are secured by any suitable means, such as by three rods 57 and nuts 58 that compress the end flanges against the ends of the tube and through gaskets 60 at the opposite ends. Inlet to the outer chamber 50 is through inlet pipe 31, and such inlet is adjacent the bottom, or closed, end 61 of inner chamber 51 that forms of chamber 51 a closed cup member. This cup member is open at the top adjacent the outlet end of air eliminator 30 which is formed by nipple 62. As indicated, nipple 62 interconnects with an elongated delivery tube 63 that terminates adjacent the bottom 61 of inner chamber 51. Inner chamber 51 is desirably held concentric with outer chamber 50 by radially spaced lugs 83. By this arrangement of concentric chambers 50 and 51, oil flowing inward through pipe 31 flows upwardly through the annular space between chambers 50 and 51 and enters chamber 51 through the open, or top, end, which is covered by a removable screen member 65. The purpose of screen member 65 is to deaerate oil flowing from the inlet and axially through the annular space between chambers 50 and 51. Screen member 65 provides an extended area through which bubbles will not pass. Preferably, this screen may be of an 80 x 80 mesh reticulated wire cloth which is suitable for breaking very fine bubbles in an oil of about 30 SAE viscosity. To prevent bursting of screen 65, if it should become clogged, and to assure a constant hydrostatic head above the screen, a static tube 82 of small diameter permits direct communication between chambers 51 and 52. Since only deaerated oil will be present in inner chamber 51, delivery tube 63 is arranged to draw oil only from adjacent bottom 61 where such oil has accumulated.

As indicated, delivery tube 63 is connected to communicate with nipple 62 and through a spring-loaded check valve 64 and thence to outflow line 32, which is connected to the supply hose 36. As shown, delivery tube 63 is substantially coextensive with the length of the chambers 50 and 51 and has its only inlet adjacent the bottom 61 of inner chamber 51. The purpose of spring check valve 64 in outlet line 32 is to prevent delivery of any fluid (oil, air or gas) through the delivery tube 63 until fluid pressure therein exceeds a predetermined value, which value will be achieved only when there is deaerated oil filling tube 63 and chamber 51. Desirably, the spring check valve may be set to release at pressures suitable to the viscosity of products to be dispensed, usually about 15 to 30 p.s.i.

As stated hereinbefore, it is the purpose of the present arrangement to provide a constant return of a small amount of fluid to the oil sump through return-flow line 41, so that there is a constant indication that oil alone is being pumped through the air eliminator. For this purpose, the outflow line terminates in fitting 39 and a sight glass 37 which terminates directly adjacent the upper end plate 54, so that said return line is directly connected to upper end closure plate 54 of outer chamber 50 and above the static tube 82 communicating with the inner chamber 51 through screen 65. Sight glass 37, details of which are shown in FIG. 3 and will be described below, provides visual evidence that oil alone is being pumped through the air eliminator by the oil supply system. As mentioned hereinabove, elbow fitting 39 is one suitable location for the interchangeable orifice 68 in return flow line 41. Orifice 68 is sized to permit full flow of gas or air that pump 14 is capable of handling, but will pass only a small amount of the incompressible fluid that pump 14 is able to supply. Thus, when the pressure system has lost its prime or for other reasons air has been included in the pumping system, such as by leaky valves or fittings, the entire pressure system is purged of air or gas through said orifice valve, and the system is unable to produce sufficient pressure to actuate the spring-loaded check valve 64 in outflow line 32, thereby reducing the flow to zero through outlet delivery tube 63 until oil pump 14 has been reprimed.

As indicated above, sight glass 37, which provides a visual display of the full fluid flow through the system, is detailed in FIG. 3. As there shown, it includes an external pipe or nipple section 70 which has a window portion formed straight through and identified as 71. Within nipple 70 there is positioned a sight glass which may suitably be formed of a short section of gauge glass, or clear plastic tube, identified as 72. As distinguished from previously known sight glass arrangements of this general type, which require radial pressure to assure fitting of the sight glass within the steel or metal jacket, such as nipple 70, the present arrangement provides means for axially loading the sight glass 72, rather than radially loading it. Such an arrangement permits a sure and permanent seal against fluid loss from the tube and also assures against breakage of the glass itself. For this reason, there is provided adjacent the ends of glass or translucent tube 72 a pair of end-sealing members identified as 73 and 74. Each of these members has a tapered seat identified as 75 directed toward the glass or glass tube 72. These end-sealing members likewise have longitudinal passages 76 which may be gauged to the flow through the tube, or if no substantial flow is desired, may be small pin holes, identified as 76. The size of the holes is, of course, dependent upon whether the tube is used as a simple indicator, such as a level gauge, or as a through-flow device, as in the present arrangement. Between the ends of the tapered seat 75 and the upper and lower ends 77 of the tube, the metal and glass are sealed against fluid leakage by a pair of O-rings identified as 78. For the purpose of compressing the O-rings 78 and firmly seating tapered seats 75 of end-sealing members 73 and 74 against ends 77 of translucent tube 72, there is provided a central axial rod 79 which may include a threaded end 80 capable of cooperating with a tapped hole 81 in one of the end faces, such as that shown in 74.

Reference is now made to FIGS. 7, 8, 9, and 10, where an alternate form of air eliminator structure is shown and generally indicated as 30A. The structure of eliminator 30A is similar in external form to that of FIG. 2, but the inner chamber 51A is modified. Inner chamber 51A is suitably supported in such spaced position to outer chamber 50 by radially spaced legs or lugs 84 removably received in sockets 85 and thus removably support inner chamber 51A coaxially within outer chamber 50 in a definitely nonrotative relationship to other structural elements to be described.

Lower closure wall 61A of cup 51A is preferably concavely arcuate, and the opposite end of the inner chamber is truncated at an incline upwardly toward return line fitting 86. This truncated upper end is covered by a similarly inclined formaninous or perforated closure plate 87 which has a large number of inverted conical perforations 88 spaced substantially over its area. These perforations 88 are aligned in rows on substantially ⅛-inch centers, and are individually quite small, such as diameters of 1⁄24 inch at the base of the cone in the plane of the plate and 1⁄32 inch at the inverted apex. It is preferred that these conical openings 88 be made by a punch which upsets and deforms the metal plate and thereby provides rough, jagged edges 89 at the smaller end of the inverted conical openings. In the drawings of FIGS. 7, 9, and 10, openings 88 are exaggerated for illustrative purposes. At the uppermost portion of the inclined, perforated plate 87 there is an enlarged opening 88A substantially larger than openings 88.

As in FIG. 2, outer chamber 50 is sealed to lower closure plate 55 and a top closure plate 54 by the recesses therein that receive the opposite circumferential edges of outer chamber 50 against a sealed O-ring seat, indicated as 56. If desired, bottom plate 55 may also have a drain plug 89 mounted therein.

As further distinguished from the embodiment of FIG. 2, the sight glass is positioned in the outflow line 32, rather than in the feedback or return flow line 41. As shown, opening 54A in plate 54 of outer chamber 50 tightly secures one end of outlet flow or delivery pipe 63 which extends through perforated plate 87 and axially into inner coaxial chamber 51A. Tube 63 is press-fitted into the lower end of sight glass nipple 70A, which in turn is threaded into the opening 54A of plate 54 by pipe threads 90. The opening, or window, 71A in nipple 70A permits one to see through the sight glass 72, so that the customer, or sealer of weights and measures, can be assured visually that only deaerated oil is being supplied to outlet line 32. Glass 72 is secured in nipple 70A by a pair of bushings 92 that are screwed into the opposite ends by internal threads 91 formed in 70A. O-rings 93 between bushings 92 and the ends of glass 72 assure a fluid-tight fit.

Because return line 41 is continually open to atmospheric pressure through orifice 68A, it is desirable that discharge line 32 from air eliminator 30A does not return to atmospheric pressure also when pump 14 stops. For this reason, and also further to assure that oil in this discharge line is not contaminated by aerated oil, a one-way check valve 64A is positioned directly above sight glass 70A. For this purpose, upper end 94 of nipple 70A is suitably ground, or faced, to form a valve seat for ball 95 which forms the operating element of one-way check valve 64A. The body of this check valve may comprise a reducer pipe fitting 96 so that ball 95 is free to move in the space 97 under fluid pressure against spring 98. Spring 98 is held in compression within the lower end of outlet pipe 32 by pin 99 and ball 95. The compression of spring 98 is not particularly critical. It should be less than the full pressure exerted by the pump and sufficient to close valve 64A when the pump fails to supply adequate pressure. For example, if the pump pressure is about 70 p.s.i., the force required to unseat valve 95 against spring 98 could suitably be about 20 p.s.i.

As further distinguished from the air eliminator of FIG. 2, FIG. 7 shows an alternate and preferred construction to control the volume of oil returned to the sump through return line 41. As indicated above, fitting 86, which in general is in the form of a pipe elbow, is threaded into upper cover 54 by pipe threads 100. Within this threaded portion of fitting 86, an orifice 68A is positioned and forms a needle-valve seat in co-operation with needle 101. By this arrangement, orifice 68A can control the feedback flow rate and is adjustable for varying viscosities of oils. In practice, needle 101 will be adjusted by turning the adjusting head on pin 102 until the desired volume is obtained. This volume will, of course, be sufficient so that orifice 68A and needle 101 will pass the full air- or gas-pumping capacity of the supply pump if the supply is depleted, or the pump loses its prime otherwise. In practice, this may suitably be about five percent of the liquid pumping capacity of the pump. Further, this adjustable feature of the orifice permits a seal 103 to be secured to needle body 102 so that once this flow to the bypass line is regulated it cannot be tampered with or changed without breaking seal 103.

In the particular arrangement of FIG. 7, as mentioned before, lugs 84 and sockets 85 position inner chamber 51A so that enlarged opening 88A, located at the highest point on inclined plate 88, is directly under the opening to orifice 68A. By this arrangement, air removed by plate 88 is entrained at that side of the inclined plate 88, and such gas, or air, in chamber 51A will also tend to rise and accumulate at the most elevated portion of the upper end of chamber 51A.

Reference is now made to FIG. 4, in which there is shown a fully automatic oil dispensing system embodying my invention. With this arrangement, it is possible to dispense oil from a remote location, such as an underground tank, indicated generally as 10A, to a dispensing hose located at a convenient location, such as a garage lubricating room, or on the pump block, or island, in a conventional service station. Such a dispensing system is indicated schematically by hose 36A, dispensing valve 25A, meter 35A, and dispensing nozzle 45A, which correspond generally to the oil dispensing portion alone of the arrangement shown in FIG. 1. If desired, hose 36A can be reeled in the same manner as water and air are made available at service station pump blocks.

However, as particularly distinguished from FIG. 1, and in accordance with an important aspect of this invention, the embodiment of FIG. 4 provides an automatic control system capable of preventing aeration of oil prior to the time the oil enters air separator 30, even if pump 14 loses its prime, either by a break in supply line 11 or by depletion of oil in tank 10A. This feature reduces substantially the work load on air eliminator 30 when used in a system dispensing oil only. Such automatic control is provided by two pump control means, one of which responds to pressure variation produced in the system by opening and closing dispensing valve 25A, and the other responds to a drop in pressure at the discharge end of separator 30 that will occur if pump 14 loses its prime.

In FIG. 4, these two control elements are represented as units 120 and 127 mounted on the support base 117 for pump system 115. Such a pump system includes an electric motor 16A driving pump 14 through a pulley and belt assembly comprising belt 17A, motor pulley 20A, and pump drive pulley 23A. In accordance with the invention, units 120 and 127 are made responsive to the discharge pressure in the dispensing system. Such pressure is obtained from line 110 which is interconnected to outflow line 32 by a 4-way, or crosshead, fitting 106 that is directly in the discharge conduit formed by line 32 and hose 36A. If desired, this operating, or flow, pressure in the discharge line may be indicated by gauge 105 which taps into one opening of fitting 106.

For a better understanding of the relationship between first control means 127 and second control means 120 to operate pump control mechanism 115, reference is made to FIGS. 5 and 6, which are enlarged views of the automatic oil dispensing system of FIG. 4.

It will be noted particularly in FIG. 5 that line 110 is connected by fitting 110A and 110B, respectively, to control units 127 and 120. FIG. 12 shows schematically the relation of units 127 and 120 to an electrical circuit through which control of pump 14 is obtained by control of pump motor 16. As there indicated, first control means 127 includes a double-pole, single-throw switch whose contacts 127A are adapted to be operated by bellows 127B. Bellows 127B is correspondingly responsive to the liquid pressure in line 110. Contacts 127A are thus opened and closed in response to normal pressure variations produced by opening and closing dispensing valve 25A. To handle the wide range of pressure required to pump liquid petroleum products of varying viscosities, control 127 should have a start-and-stop range adjustable from about 10 p.s.i. to about 300 p.s.i. and an adjustable differential pressure of approximately 90 p.s.i. Thus, if the starting pressure is set at 100 p.s.i., stopping pressure in line 110 would be allowed to reach 190 p.s.i. before contacts 127A would be opened by bellows 127B.

Second control means 120 is of a special design and is particularly shown in FIG. 11 and will be described in more detail below. It includes a similar double-pole, single-throw switch having contacts 120A that are in series with contacts 127A of unit 127. Contacts 120A are operated through a push button 120B which in turn is operated by lever 131 pivoting about point 183. Lever 131 acts as a normal cocking lever to close contacts 120A of switch 120 by hand at the start of operation of the oil dispensing system and thereby supply current to contacts 127A until such time as the pressure in line 110 exceeds a predetermined low value that will operate unit 120. When such low pressure value is reached in line 110, hydraulic operator 128 extends rod 179 to a position such that end 181 holds contacts 120A closed against the operation of spring 120C.

As best seen in FIG. 11, hydraulic control unit 128 includes cylinder 129, one end of which is connected to line 110 by fitting 110B. Piston 174 is slidably mounted in cylinder 129 and urged to the left-hand side of the cylinder by spring 175. The initial compression of spring 175 is controlled by an adjustable spring seat member 177 that is threadably received in the right-hand part of cylinder 129. Stem 178 is rotatable either by hand, or by wrench, to apply the desired compression to spring 175. Piston rod 179 then extends centrally from piston 174 through the end of cylinder 129 and stem 178 and terminates in an end portion 181 that operates against cocking lever 131 to pivot it about pin 183. As further indicated, contacts 120 are normally open, so that upon a drop in pressure in line 110 spring 175 exerts a greater force on piston 174 than the fluid pressure in line 110. This retracts rod 179 and permits lever 131 to be opened by spring 120C in control unit 120. Adjusting screw 184 forms an adjustable stop that controls the total travel of lever 131 toward the explosion-proof case 120D enclosing electrical contacts 120A.

This automatic shut-off by control means 120 and 127 does what might be done manually if an attendant were in close proximity to pump 14 and became aware of oil depletion from tank 10A. However, such is not usually the case or generally even possible. It will thus be understood that by shutting off the oil pump promptly, when the pump pressure drops because of a leak or break in the supply line, or when the oil supply becomes depleted, then the liquid contents of air eliminator 30 and liquid in the line to eliminator 30 will not become aerated by the pumping of air. And upon restarting pump 14 after the oil supply in the reservoir tank has been replenished, the task of the air eliminator consists only of wasting that small amount of straight air and air droplets in the oil in the suction line between the pump and reservoir chamber 51A of air eliminator 30A. After the pump has lost its prime from a break in the supply line, or from having depleted the oil supply, the liquid pressure output of the pump will then be too low to open back-pressure ball valve 64A, and such pressure will remain too low until substantially full pumping pressure of liquid has been restored. And because of orifice 68A in return line 41, and uncontaminated oil in chamber 51A, there is no effective air pressure exerted directly against back-pressure valve 64A from air eliminator 30A. However, as mentioned above, back-pressure valve 64A will hold the pressure in line 36A at the desired pressure until such time as dispensing valve 25A is opened to deliver oil through nozzle 45A.

It will be apparent that, during normal operation, back-pressure valve 64A also obviates the necessity for running pump 14 continually, or on short cycle, since once discharge line 32 is brought up to the pressure required to open contacts 127A of controller 127, motor 16 will stop and remain stopped until pressure in lines 32 and 110 falls below the cut-in pressure required to close bellows 127B.

Figure 13:
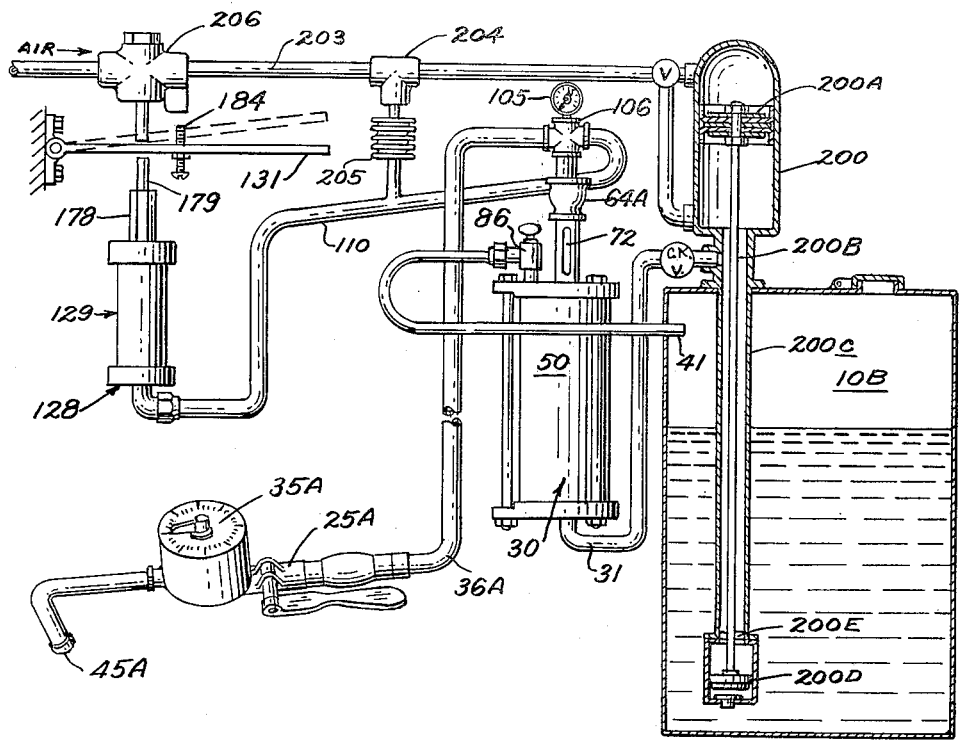
FIG. 13 is a diagrammatic side elevation of layout for a modified form of the invention incorporating an air valve and air-powered pump.
Figure 14:
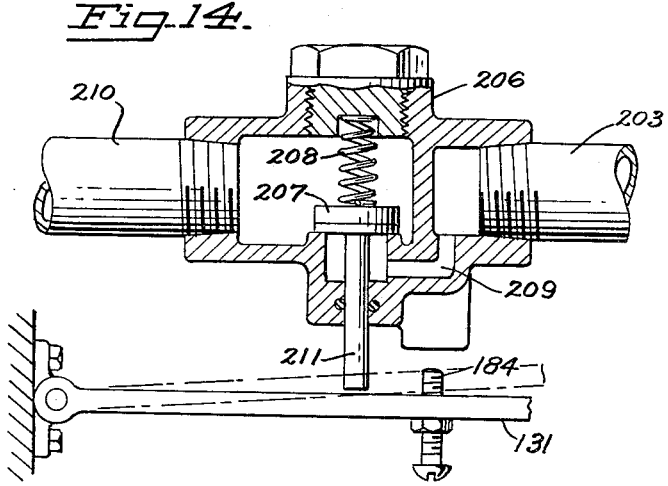
FIG. 14 is an enlarged longitudinally vertical section of the air valve shown in FIG. 13.

FIGS. 13 and 14 show a further embodiment of my automatically controlled oil dispensing system. As distinguished from the arrangements of FIGS. 1–12, however, the unit is pneumatically operated by an air-operated pump means 200. Such pumps are frequently available, and used, in garages and service stations where it is desired to avoid explosion hazards or the cost of explosion-proof electrical equipment. Air pump 200 in FIG. 13 is a commercially available unit and is represented schematically as including an air-operated piston 200A which is connected by piston rod 200B operating in tube 200C to reciprocate pump piston 200D in pump body 200E.

In other respects, the air eliminator and dispensing system are similar to the embodiment of FIG. 4, except that supply tank 10B is indicated as being an oil drum, or barrel. In providing dual control of air pump 200 to prevent undue aeration of oil remaining in supply lines 200C and 31, and outer chamber 50 of eliminator 30, two control units are placed in series in air supply line 210. The first control means is designated as air valve 204, which is operable by a pressure-responsive element such as Sylphon bellows 205. Bellows 205 operate air valve 204 in response to normal pressure variations in delivery line 36A caused by opening and closing delivery line 25A. A second control means is a similar air valve 206 connected in series and ahead of the first control means, air valve 204. The operating means for air valve 206 may suitably be hydraulic operator 128 illustrated and described in connection with FIG. 11.

The construction of valve 206 is particularly shown in FIG. 14. As there shown, the valve includes operating piston 207, biased by spring 208 to a normally closed position, as indicated, to shut off air supply line 210 to supply line 203 by way of passage 209. Valve 207 can be manually opened by cocking lever 131 to depress valve stem 211. In this way, air pressure is admitted to line 203 so that air pump 200 may be initially operated to bring the delivery system up to operating pressure. As in the electrically operated system of FIG. 4, lever 31 is held until the pressure in the discharge conduit reaches the prescribed operating pressure range.

In summary, it will be seen that the salient features of my automatic dispensing system to deliver the full measure of metered oil reside in the combination of a first means for preventing aerated oil from entering the metered dispensing system and a second means to reduce or prevent aeration of the oil by the pump means if the supply is exhausted. Said first means includes an intermediate reservoir, or temporary storage tank, within an outer chamber that forms part of the discharge conduit, and a feedback or return line whose flow is controlled by an orifice that will pass the full gas, or air, pumping capacity of the pump back to the supply reservoir. Thus, if prime is lost, or for other reasons the oil in the pumping system becomes aerated, an uncontaminated supply remains in the intermediate storage tank until such time as full fluid flow is re-established between the pump and the dispensing system. Said second means to prevent aeration of liquid includes means responsive to an abnormal pressure condition in the dispensing system to stop or prevent automatic operation of the pump means in response to normal pressure variations produced by opening and closing the dispensing valve. The second means further insures that the pump will not continue to run and thereby unduly aerate fluid remaining in the intake and discharge lines if the pump loses its prime.

While only a few embodiments of my air eliminator and its incorporation into a fully automatic liquid dispensing system for petroleum have been shown and described, all modifications covered by the appended claims are intended to be included therein.

I claim:

1. Apparatus for eliminating air, gas, and the like, from an oil supply being pumped by a pressure system from a supply tank which comprises means forming a first chamber having inlet means at one end and outlet means at the opposite end, a settling tank member substantially coextensive in length with the first chamber means, said settling tank being radially spaced from the walls of said first chamber and closed at the end adjacent the inlet to said first chamber means, a screen member covering the opposite end of said settling tank member adjacent the outlet end of said first chamber, a delivery tube connected to said outlet means substantially coextensive with the length of said first chamber means and said settling tank member and having an inlet within and adjacent the closed end of said settling tank member, spring-loaded check valve means in said outlet means for preventing delivery of fluid through said delivery tube until the fluid pressure therein exceeds a predetermined value, and a fluid return line comprising an outflow line parallel to said outlet means for said first chamber, said outflow line being connected to the space between the upper end of said settling tank member and said outlet end of said first chamber means, said return line including an orifice selected to permit full gas flow from the pressure system pumping said fluid when said pressure system has lost its prime but inadequate in size to substantially reduce full liquid flow through said outlet delivery tube and said outlet means, when said eliminator is fully primed with liquid.

2. Apparatus in accordance with claim 1 in which a static tube extends above said screen member and terminates below said outlet end of said first chamber, said static tube permitting oil to stand at a predetermined height above said screen member and to permit pressure equalization across said screen member when said first chamber is being replenished with liquid.

3. Apparatus in accordance with claim 2 in which said screen member is a wire cloth mounted on the upper end of said settling tank member to permit interchanging the mesh sizes for degassing liquids of different viscosities and said static tube means is secured to said screen member.

4. An air eliminator for an oil delivery system that includes a pump for supplying oil from a tank to a metering system comprising means forming a pair of concentric chambers, means for connecting the bottom of the outer of said chambers to the output of said pump, said outer chamber being sealed at the top and bottom, the inner of said concentric chambers comprising a cup member having a solid bottom adjacent the inlet of said outer chamber, a screen member secured to the top of said inner chamber for deaerating oil flowing from the inlet through the concentric passageway formed between said cylinders and over said screen member, a delivery tube sealed to the top of said outer chamber and connectible to an outlet line, said delivery tube extending from a point adjacent to the bottom of said inner cup member to said top of said outer chamber whereby oil is expelled through said outlet only after passage over and through said deaerating screen, check valve means coupled to said outlet line for said outer chamber to prevent delivery of oil and air therethrough until the pressure in said inner chamber exceeds a preselected value, and a return line connected to the upper end of said outer chamber and in direct communication with the space between said screen member and the top of said outer chamber, said return line including an orifice to permit a predetermined quantity of oil to be bled back into the supply tank and sight glass means in one of said lines to provide a visual indication that all air is being eliminated from said outlet line.

5. Apparatus for metering a known quantity of viscous liquid, such as oil, from a supply tank to liquid dispensing lines through a delivery valve without inclusion of air and gas particles in the metered liquid, which comprises an intake line including a foot valve adapted to be positioned near the bottom of the supply tank from which said liquid is being drawn, a pump connected to said intake line for lifting oil from said supply tank through said intake line, relief valve means connected to the outlet of said pump for returning oil to said supply tank when outflow from said pump is cut off by closure of said delivery valve to end liquid delivery, an air eliminator connected to the output of said pump, said air eliminator including an elongated flow path which includes an air and gas deaerating screen means intermediate the inlet and outlet ends of said air eliminator and an outflow line connected to said delivery valve, a metering device intermediate said valve means and the exit point from a liquid-dispensing line, and a feedback line from said air eliminator to said supply tank to demonstrate that liquid alone is flowing from said air eliminator, said feedback line including an orifice proportioned to the oil and gas displacement of said pump, said orifice being adequate in size to transmit the entire gas and air capacity of said pump therethrough, but insufficient in size to flow more than a small proportion of the liquid flow from said pump, and means for visually displaying the return of said liquid passing through said orifice to said supply tank.

6. Apparatus for delivering a gas-free liquid, such as lubricating oil, from a supply tank to a dispensing nozzle through a metering device which comprises a gas eliminator, an intake line connected between said supply tank and said gas eliminator, means for pumping liquid from said supply tank through said intake line to said gas eliminator, said gas eliminator including a cup member, an outflow line connected between said cup member and said dispensing nozzle, an outer chamber surrounding said cup member, said intake line being connected to one end of said outer chamber and the open end of said cup member being at the opposite end of said chamber, gas bubble breaking means in the flow path ahead of said open end of said cup member to permit filling of said member with gas-free liquid, and means forming a by-pass line from said outer chamber to said supply tank to return a small portion of said liquid to said supply line when said outer chamber is filled with liquid but capable of flowing all gas pumped by said pumping means to said supply tank to prevent flow of gas into said cup member and depletion of gas-free liquid from said cup member when liquid from said tank is exhausted.

7. Apparatus to prevent aerated fluid from being measured as a part of a liquid, such as lubricating oil, when it is delivered through a metered dispensing system comprising
  (a) means for pumping liquid from a supply reservoir subject to depletion of such liquid during delivery,
  (b) dispensing means including (1) a discharge conduit, (2) a dispensing valve to control flow from said discharge conduit, and (3) meter means for indicating the volume of liquid passing from said valve to a dispensing nozzle,
  (c) means connecting said dispensing means to said pumping means including first means for preventing aerated fluid from entering said discharge conduit from said pumping means,
  (d) said first means comprising (1) an intermediate reservoir tank, (2) a conduit extending from the bottom of said tank and interconnected to said discharge conduit through a check valve, (3) housing means surrounding said tank, (4) means for connecting said pumping means to the end of said housing remote from the inlet to said tank, (5) means for deaerating liquid passing from said housing into said tank, and (6) a feedback line from said housing to said supply reservoir, said feedback line including a flow control orifice adapted to pass the entire air pumping capacity of said pumping means but only a small portion of its liquid pumping capacity, and said line being connected to said housing so that if air or aerated fluid enters said housing the liquid in said reservoir tank remains relatively uncontaminated,
  (e) and second means for avoiding aeration of oil from said reservoir supply to said first means if said pumping means loses its prime comprising (1) first control means responsive to normal pressure variations in said discharge conduit due to opening and closing of said dispensing valve, and (2) second control means responsive to a low pressure in said discharge conduit for stopping said pumping means, said second control means being operative to disable said first control means until liquid pressure in said discharge means can be established by liquid in said supply reservoir.

8. An automatic liquid dispensing system for delivering oil and the like, susceptible to entrainment of air therein, without inclusion of air in the oil measured through a registering meter comprising
  (a) means for pumping dispensable liquids from a reservoir supply,
  (b) a discharge conduit having a dispensing valve to control the flow of said pumped liquid through a registering meter,
  (c) an air eliminator device in said conduit intermediate said pump and said dispensing valve,
  (d) a one-way check valve in the liquid flow line between said air eliminator and said dispensing valve,
  (e) said check valve being spring-biased to close against a predetermined liquid pressure flow from said air eliminator that is less than about the full pressure flow of liquid from said pump,
  (f) first control means operative respectively to start and stop said pump means automatically in response to predetermined variations in liquid pressure in said discharge conduit by opening and closing of said dispensing valve, (g) and second control means automatically operative in response to variations in liquid pressure in said discharge conduit beyond said check valve to maintain said pump means operative to pump liquid when said liquid pressure in said discharge conduit is greater than the starting pressure of said first control means, (h) but said second control means being adapted to stop the operation of said pump means in response to a liquid pressure in said discharge conduit downstream relative to said check valve that is a predeterminable low value relative to the starting pressure of said first control means whereby said pump means is stopped to prevent aeration of the oil supplied by said pump means to said air eliminator and said discharge outlet, and thereby preventing dispensing of deaerated oil from said meter.

9. An automatic oil dispensing system as set forth in claim 8, and in which
 (a) said pump means is an air-operated pump,
 (b) and said second control means includes an air valve in the air supply conduit for said pump, said valve being spring-biased to a closed position,
 (c) and said second control means including a cylinder having a hydraulic pressure chamber in communication with said liquid discharge conduit,
 (d) a piston in said cylinder being spring-biased toward said pressure chamber,
 (e) means exterior of said cylinder for adjusting the spring-bias on said piston,
 (f) a piston rod having one end connected to the piston and having its opposite end extended beyond said cylinder,
 (g) said extended end of said piston rod being operable to maintain said air valve open when the liquid pressure in said discharge conduit and in said pressure chamber is between the start and stop pressure of said first control means,
 (h) and said piston of said second control means being movable in response to its biasing spring when the liquid pressure in the discharge conduit is lower than the starting pressure of the air pump, said piston rod being thereby retracted to release said valve in the air supply conduit to stop said air pump.

10. A liquid dispensing device of the character described as set forth in claim 8,
 (a) said pump means being operable by an electric motor connectible to an electric circuit,
 (b) said first control means being operative to start and stop said pump in response to predetermined variations of liquid pressure in the discharge conduit comprising a first electric switch,
 (c) said second control means including a second electric switch in the electric circuit of said pump, said second switch having contact means normally urged to open position to break the circuit of the pump,
 (d) and said second control means being responsive to liquid pressure in said discharge conduit to maintain said second switch closed when said liquid pressure in said discharge conduit is within the predetermined range of automatic start and stop pressures for operation of said first switch.

11. Control apparatus for air eliminators in liquid dispensing apparatus, including
 (a) a pump for pumping dispensable liquids from a reservoir supply,
 (b) a discharge conduit connected to the outlet of said pump and having a valve-controlled outlet for pumped liquids,
 (c) an air eliminator device in said conduit intermediate said pump and said discharge outlet,
 (d) a one-way check valve in the liquid flow conduit outlet between the air eliminator and discharge conduit biased to close against a predetermined liquid pressure flow from the air eliminator less than about the full pressure of liquid flow from said pump,
 (e) a first control means operative to respectively start and stop said pump and responsive to predetermined variations of liquid pressures in said discharge conduit between said check valve and said valve controlled discharge outlet,
 (f) and a second control means operative in response to liquid pressure in said discharge conduit between said check valve and said discharge outlet to stop said pump when the liquid pressure beyond said check valve is a predeterminable low value relative to the liquid pressure required for said first control means to start said pump.

12. A control means for liquid dispensers, as set forth in claim 11,
 (a) in which said second control means includes a cylinder,
 (b) a piston slidable in said cylinder and forming a pressure chamber between one end of said cylinder and one side of said piston, said pressure chamber being connected by conduit means to communicate with said valve-controlled discharge conduit,
 (c) a coil spring in said cylinder at the opposite side of said piston tensioned to urge the piston toward said pressure chamber,
 (d) said piston having a piston rod at its said opposite side and extending through said coil spring and beyond said cylinder and adapted for movement outwardly by pressure on said piston to maintain said pump operative in response to liquid pressure in the discharge conduit between the start and stop pressures of said first control means,
 (e) and means for adjusting the initial position of said rod from the exterior of said cylinder for adjusting the tension of said spring.

References Cited by the Examiner
UNITED STATES PATENTS

| | | | |
|---|---|---|---|
| 1,825,775 | 10/31 | Brubaker | 222—63 |
| 2,264,344 | 12/41 | Svenson | 222—73 X |
| 2,307,085 | 1/43 | Trexler | 222—72 X |
| 2,678,752 | 5/54 | West | 222—63 |
| 2,731,171 | 1/56 | Mankin | 222—72 X |
| 3,057,518 | 10/62 | Japp | 222—72 X |

LOUIS J. DEMBO, *Primary Examiner.*